UNITED STATES PATENT OFFICE.

WILHELM RUPPEL, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

PROCESS OF PRODUCING A REMEDY FOR TUBERCULOSIS.

1,037,997. Specification of Letters Patent. Patented Sept. 10, 1912.

No Drawing. Application filed July 18, 1910. Serial No. 572,638.

*To all whom it may concern:*

Be it known that I, WILHELM RUPPEL, Ph. D., professor of medicine, a citizen of the Empire of Germany, residing at Höchst-on-the-Main, Germany, have invented certain new and useful Improvements in Processes for Producing Remedies for Tuberculosis, of which the following is a specification.

Hitherto it has not been possible to show by the usual means, namely by attempts to protect and cure small test animals, the presence of specific immune-bodies in the blood-serum of animals previously treated with tubercle-bacilli or preparations therefrom. However, it is possible to prove the presence of specific immune-bodies *in vitro*. The immune-bodies of tuberculosis hitherto discovered are agglutinins, complement-fixing substance, and opsonins or bacteriotropins. An efficacious antituberculosis-serum should contain all these substances in as large a quantity as possible and in adequate proportions to one another. Generally speaking, agglutinins are produced by introducing bacteria cells into an organism. In order to prove the presence of these immune-bodies the respective immune-serum is caused to act *in vitro* upon emulsions of the species of bacterium used for the immunization. If agglutinins are present, the bacteria are frequently agglomerated and precipitated even by small quantities of the immune-serum.

Complement-fixing substances are chiefly produced by the action of specific antigens, for instance, of bacteria or bacteria extracts. Their presence is also proved *in vitro* by the respective antigen fixing the complement of a hemolytic system by means of its immune-body, and thereby preventing the hemolysis. Opsonins or bacteriotropins are also produced, besides the aforesaid immune-bodies, by immunizing with bacteria. Their presence can be proved both in the animal body and *in vitro*, for, if bacteria meet with human or animal leucocytes, they will be phagocyted by the leucocytes in consequence of the action of the immune-serum in a larger amount than when normal sera are used.

In the specific case of tuberculosis, there are produced agglutinins by introducing living or mortified, changed or unchanged, tubercle-bacilli into tuberculous or healthy individuals. The complement-fixing substances are chiefly formed by the tuberculin. Opsonins or bacteriotropins are formed in the blood-serum of tuberculous individuals and can be increased by systematic immunization.

Now, I have found, and the discovery forms the basis of this invention, that for obtaining considerable quantities of specific immune-bodies, it is absolutely necessary that the animals used for the immunization should possess a hypersensitiveness to tuberculin. Tuberculous individuals have this property in themselves, while it can be imparted to healthy individuals by a proper preliminary treatment with tubercle-bacilli.

Tuberculous animals are, of course, unsuitable for the production of an effective immune-serum, because their resistance is too much weakened and because the immune-bodies possibly produced in them, are used for healing processes in their own organism. Owing to this fact, in tuberculosis individuals the secretion of immune-bodies into the blood-serum and their accumulation therein occurs only to a very small extent. Quite a different behavior is exhibited by individuals which are not affected with a progressing tuberculosis and nevertheless react to injections of tuberculin and similar derivatives of tubercle-bacilli in the manner really characteristic for tuberculous animals.

In order to produce hypersensitiveness to tuberculin, healthy animals,—the most suitable being horses, mules, donkeys and cattle—are first subjected to a preliminary treatment, preferably intravenously, with emulsions of living tubercle-bacilli of human origin. The tubercle-bacilli cultivated from tuberculous diseases of men do not generally produce progressive tuberculosis in the said animals, but they render them for a long time capable of resisting the effects of a later infection with tubercle-bacilli of bovine origin. This preparatory immunizing introduction of tubercle-bacilli of human origin already produces in the said animals considerable hypersensitiveness to tuberculin. This hyper-sensitiveness can be removed by repeated injections of tuberculin or other preparations of tubercle-bacilli in successively increased doses, that is to say the animals are thereby rendered immune from the effects of tuberculin. Already at this stage specific immune-bodies are formed, and in order to increase the formation, it is necessary to render the animals again hypersensitive to tuberculin. This is attained by now treating the animals, rendered immune, with such tubercle-bacilli as, according to experience, produce progressive tuberculosis in the animals of the respective species. The next treatment of the animals consists therefore in first injecting mixtures consisting of tubercle-bacilli of human origin and tubercle-bacilli which are pathogenic to the respective species. Thereupon the artificially produced hypersensitiveness is caused again to disappear by a systematic treatment with tuberculin or another preparation of tubercle-bacilli, and is again produced by an increased dose of the mixture of apathogenic and pathogenic tubercle-bacilli. This alternate treatment with progressively increasing doses is repeated with the object, on the one hand, of producing the continual alternation of the hypersensitiveness and the non-sensitiveness to tuberculin, and, on the other hand, of obtaining a long period of resistance to infection with pathogenic tubercle-bacilli. Finally there may be used instead of the mixture of pathogenic and apathogenic tubercle-bacilli, the first named bacilli alone for producing a fresh hypersensitiveness to tuberculin.

The invention will be best illustrated by the following example:—An ox, the blood-serum of which showed no traces of immune-bodies, was, by way of experiment, injected with tuberculin. No rise of temperature followed and therefore the animal could be regarded as free from tuberculosis. The animal then received an intravenous injection of 0.01 gram of living tubercle-bacilli of human origin emulsified in 10 cc. of a physiological salt solution. Four weeks later the same ox was again tested by injection of tuberculin and then showed a typical febrile reaction. The tuberculin inoculations were then repeated at intervals of about 4–5 days, the quantity of tuberculin injected being only increased when no rise of temperature had set in after the preceding dose, while an equal quantity of tuberculin was injected on each occasion so long as a distinct febrile reaction could be detected as a result of the injection. Thus, the animal received, four weeks after the first injection of living tubercle-bacilli, 1 cc. of tuberculin, whereupon there was a reaction (rise of temperature) to 41° C. Eight days later a like quantity of tuberculin was injected whereupon the animal's temperature rose to 40.5° C. Five days afterward the same treatment produced no rise of temperature in the animal. Thereupon there were injected successively, at intervals of 4–5 days, 2 cc., 5 cc., 10 cc., 20 cc., and finally 50 cc. of tuberculin, which doses the animal stood without showing any reaction. This undoubtedly proved that all hypersensitiveness to the tuberculin had disappeared. The examination of the blood-serum now showed slight traces of specific immune-bodies. The ox then received injections of increased quantities of tubercle-bacilli of human origin up to the maximum dose of 2.0 grams and the hypersensitiveness to the tuberculin, which arose each time but gradually weakened, was caused to disappear in the manner above described. The examination of the blood-serum showed already at this stage a large increase of specific immune-bodies. When the injection of large doses of tubercle-bacilli of human origin was not followed by a fresh hypersensitiveness to tuberculin, the ox received an intravenous injection of a mixture consisting of 0.01 gram of tubercle-bacilli of human origin and of 0.01 gram of those of bovine origin in 100 cc. of a physiological salt solution. Several weeks afterward, a fresh hypersensitiveness to tuberculin was apparent, which was again removed by tuberculin. Thereupon the mixtures of tubercle-bacilli of both origins were successively injected in increasing quantities up to the maximum dose of 0.2 gram each, and the hypersensitiveness to tuberculin arising between each injection was caused to disappear by injections of tuberculin. Finally, when in the foregoing manner no further hypersensitiveness to tuberculin could be produced, tubercle-bacilli of bovine origin only were injected. There was again produced hypersensitiveness to tuberculin which could be caused to disappear gradually in the aforesaid manner by injections of tuberculin and could be used for increasing the amount of immune-bodies. Whenever the hypersensitiveness to tuberculin disappeared the blood-serum of the ox was, in the course of the treatment, examined $in$ $vitro$ as to the amount of immune-bodies it contained; it was found that these bodies gradually increased. Thus the test for agglutins showed an agglutinating power of 1:3000. The amount of complement-fixing substance was demonstrated by the fact that 0.001 cc. of the serum with 0.01 cc. of tuberculin produced a complete deviation of the complement in the hemolytic system. The opsonic index of the immune-serum could be increased in the course of the treatment to 2.0.

The animals having stood several of the described periods of treatment, are slightly bled a short time after the last injection. The serum is separated in the usual manner and tested for its agglutinizing, precipitating and complement fixing properties, although the opsonic index is exactly determined. When all the tested amounts have the desired strength, the animals are bled in the known manner and the serum is collected after separation. This serum being an amber-colored and absolutely clear liquid, has the property of neutralizing the toxins of the tubercle-bacilli, and will be used for the cure and for the prevention of tuberculosis.

Having thus described the nature of my said invention and the best means I know of carrying the same into practical effect, I claim:

The process of producing efficacious antituberculous serum, which consists in rendering normal animals, which are not hypersensitive to tuberculin, hypersensitive to tuberculin, by intravenous injections of living tubercle-bacilli which are apathogenic for the respective species, making the hypersensitiveness to tuberculin thus produced disappear by injecting increasing quantities of a preparation of tuberculin-bacilli, then reproducing repeatedly the hypersensitiveness to tuberculin by successive injections of increasing quantities of living tubercle-bacilli, removing this hypersensitiveness by treatment with a preparation of tubercle-bacilli, and finally bleeding the animals several weeks after the last injection, that is to say, at the time when the amount of specific immune-bodies in the blood of the treated animals has risen to the desired strength, and allowing this blood to coagulate spontaneously, whereby the serum separates.

In testimony whereof, I affix my signature in presence of two witnesses.

WILHELM RUPPEL.

Witnesses:
AUGUST OOSTERMAN,
MARIX HÄTTIG.

---

Copies of this patent may be obtained for five cents each, by addressing the "Commissioner of Patents, Washington, D. C."